United States Patent [19]

Shimoni et al.

[11] Patent Number: 5,334,828
[45] Date of Patent: Aug. 2, 1994

[54] BORESIGHT SYSTEM AND CALIBRATION METHOD

[75] Inventors: Uri Shimoni, Kiron; Lewis Colman, Jerusalem; Moshe Meidan, Ramat Hasharon, all of Israel

[73] Assignee: Israel Aircraft Industries Ltd., Lod, Israel

[21] Appl. No.: 934,205

[22] Filed: Aug. 19, 1992

[30] Foreign Application Priority Data

Aug. 30, 1991 [IL] Israel .......................... 99346

[51] Int. Cl.⁵ .......................................... H01J 40/14
[52] U.S. Cl. ................................. 250/206.2; 356/400
[58] Field of Search ............. 250/206.2, 206.1, 203.2, 250/203.6, 216; 256/141, 152, 1, 400

[56] References Cited

U.S. PATENT DOCUMENTS

| | | | |
|---|---|---|---|
| 3,761,714 | 9/1973 | Fernandez et al. | 250/348 |
| 4,155,096 | 5/1979 | Thomas et al. | 250/203.2 |
| 4,649,274 | 3/1987 | Hartmann | 250/341 |
| 4,762,411 | 8/1988 | Pitalo et al. | 356/400 |
| 4,790,651 | 12/1988 | Brown et al. | 356/4.5 |
| 4,811,061 | 3/1989 | Sud et al. | 356/400 |
| 4,917,490 | 4/1990 | Schaffer, Jr. et al. | 356/152 |
| 4,928,019 | 5/1990 | Tomikawa et al. | 356/400 |
| 4,946,277 | 8/1990 | Marquet et al. | 250/206.1 |
| 5,008,527 | 4/1991 | Wilk | 250/216 |
| 5,025,149 | 6/1991 | Hatfield, Jr. | 356/152 |
| 5,054,917 | 10/1991 | Pepin et al. | 250/206.2 |
| 5,055,666 | 10/1991 | Miyahara et al. | 250/206.1 |
| 5,164,602 | 11/1992 | Lettans | 356/400 |

FOREIGN PATENT DOCUMENTS

| | | | |
|---|---|---|---|
| 0287032 | 10/1988 | European Pat. Off. | 250/203.2 |
| 1367531 | 9/1974 | United Kingdom . | |
| 1397262 | 6/1975 | United Kingdom . | |
| 1407021 | 9/1975 | United Kingdom | G02B 21/18 |
| 1470756 | 4/1977 | United Kingdom | G02B 27/10 |
| 1553849 | 10/1979 | United Kingdom | F41G 1/38 |
| 2077937 | 12/1981 | United Kingdom | G02B 5/14 |

*Primary Examiner*—David C. Nelms
*Attorney, Agent, or Firm*—Darby & Darby

[57] ABSTRACT

An optical system including a beam of radiation, an optical sensing device and boresighting apparatus. The boresighting apparatus includes apparatus for sensing the location of the beam of radiation relative to a given beam reference location and for providing an output indication thereof and including computing apparatus receiving the output indication from the optical sensing device. The boresighting apparatus further includes apparatus for defining an aiming location in the optical sensing device which aiming location is related to the output indication and including apparatus for providing an optical system reference image at a predetermined spatial separation from the beam reference location which is sensible by the optical sensing device.

14 Claims, 2 Drawing Sheets

BORESIGHT SYSTEM AND CALIBRATION METHOD

FIELD OF THE INVENTION

The present invention relates generally to electro-optical systems and, in particular, to boresighting apparatus for electro-optical systems employing a laser designator and a radiation sensing device.

BACKGROUND OF THE INVENTION

In an electro-optical thermal viewing and targeting system there are typically provided a radiation sensing device, such as a FLIR (Forward Looking InfraRed sensor), typically being sensitive to radiation in the infrared and a laser designator, emitting radiation in the near or medium infrared range at a wavelength different from that of the FLIR. In order to ensure that the image on the radiation sensing device reflects the position of the laser, it is necessary to ensure that the lines of sight of the laser and the FLIR are parallel. This is known as boresighting.

A conventional laser boresighting system focuses a portion of the laser energy onto a heat conductive element, such as ceramic, so as to cause it to become heated and thus emit thermal energy in the range of sensitivity of the FLIR. The thermal energy is focused onto the FLIR along an axis having a predetermined orientation relative to the line of sight of the laser. The thermal image thus produced on the FLIR provides an indication of the correlation of the respective lines of sight of the FLIR and the laser.

The system described requires that there be an optical path between the laser and the FLIR. Furthermore these systems suffer from a problem of synchronization between the laser and the FLIR since the pulse length of the laser is much shorter than the scan time of the FLIR.

SUMMARY OF THE INVENTION

It is an aim of the present invention to provide an electro-optical boresighting apparatus for systems which employ a laser designator and a radiation sensing device for sensing radiation of a wavelength which may differ from that of the radiation emitted by the laser, wherein no optical connection between the laser and the sensing device is required, thereby imparting greater flexibility in installation of the boresighting system.

It is a further aim of the invention to provide an electro-optical boresighting system wherein systematic and other errors may be electronically corrected.

There is provided, therefore, in accordance with a preferred embodiment of the invention, an optical system including a beam of radiation, an optical sensing device and boresighting apparatus. The boresighting apparatus includes apparatus for sensing the location of the beam of radiation relative to a given beam reference location and for providing an output indication thereof and including computing apparatus receiving said output indication from the optical sensing device. The boresighting apparatus further includes apparatus for defining an aiming location in the optical sensing device which aiming location is related to the output indication and including apparatus for providing an optical system reference image at a predetermined spatial separation from the beam reference location which is sensible by the optical sensing device.

In a preferred embodiment of the invention the apparatus for sensing includes a position detector placed in the beam of radiation.

In a preferred embodiment of the invention the optical sensing device is operative to sense infra-red radiation outside the visible spectrum.

Preferably, the computing apparatus is operative to provide a video output indicating the aiming location superimposed on the field of view seen by the optical sensing device.

The apparatus further includes, in a preferred embodiment of the invention, apparatus for providing an optical system reference image sensible by the optical sensing device at a predetermined spatial separation from the beam reference location. Preferably the apparatus also includes apparatus for adjusting the position of the video output indicating the aiming location in response to the output indication.

In a preferred embodiment of the invention, the optical sensing device operates at a first wavelength and the radiation beam source operates at a second wavelength different from the first wavelength. The reference image is directly sensible by the optical sensing device in a preferred embodiment of the invention. In an alternative embodiment of the invention, the reference image is indirectly sensible by the optical sensing device. In the alternative embodiment the apparatus also includes scintillation apparatus for receiving the radiation of the reference image and providing a radiation output directly sensible by the optical sensing device.

There is further provided in a preferred embodiment of the invention an optical system including a beam of radiation for marking a target, an optical sensing device for viewing the target and boresighting apparatus for measuring deviations between the beam of radiation and the optical sensing device, characterized in that the boresighting device does not include a common optical path for the beam and the sensing device.

In a preferred embodiment of the invention the boresighting device includes apparatus for sensing the location of the beam of radiation relative to a given beam reference location and for providing an output indication thereof. Preferably the boresighting apparatus also includes apparatus for viewing an image produced by the optical sensing device, apparatus for providing on the image an indication of the position of impingement of the beam on the target and apparatus for moving the indication of position in response to the output indication. Preferably the boresighting apparatus also includes apparatus for providing an optical system reference image sensible by the optical sensing device at a predetermined spatial separation from the beam reference location and for moving the indication of position in response to the position of the reference image on the optical sensing device.

BRIEF DESCRIPTION OF THE DRAWINGS

The present invention will be understood and appreciated more fully from the following detailed description, taken in conjunction with the drawings, in which.

DETAILED DESCRIPTION OF A PREFERRED EMBODIMENT

Figure 1:
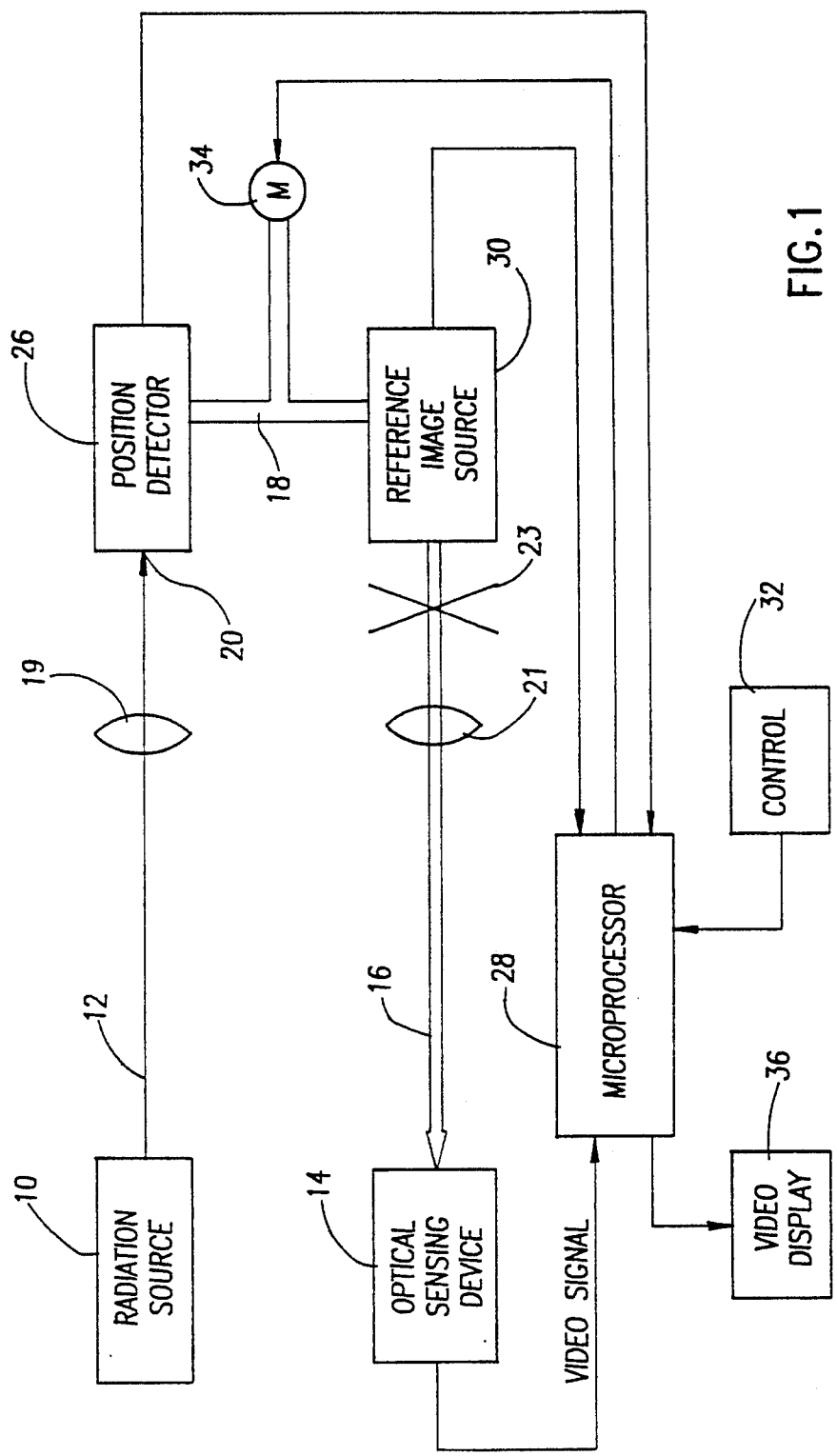
FIG. 1 is a schematic representation of electro-optical viewing apparatus employing a boresighting system, constructed and operative in accordance with a preferred embodiment of the present invention.

Reference is now made to FIG. 1, in which there is illustrated electro-optical viewing apparatus incorporating a boresighting system, constructed and operative in accordance with the present invention. The viewing apparatus typically employs a radiation source 10, such as a laser designator, defining a first optical axis 12 along which beams of laser energy are directed. A Xenon beam source may alternatively be employed instead of the laser designator. The viewing apparatus is preferably of a sort that is suitable for nighttime use, employing an optical sensing device 14, such as a FLIR (Forward Looking InfraRed detector) or, alternatively, a TV camera, direct view optics or an image intensifier (including a scintillating screen sensitive to the desired radiation frequency), defining a second optical axis 16.

In electro-optical apparatus such as shown in FIG. 1, it is desirable to maintain the respective optical axes 12 and 16 of radiation source 10 and optical sensing device 14 in mutually boresighted relationship. As is well known, however, to those skilled in the art, boresighting of the optical axes is difficult to maintain without periodically adjusting the relative axes of radiation source 10 and sensing device 14. In brief, loss of boresighting may result from a number of causes; principal causes including differential thermal expansion within the apparatus and high dynamic forces such as may be experienced when using the apparatus on a vehicle traveling over rough terrain, or on a ship or aircraft.

Accordingly, it may be necessary to realign the optical apparatus, such that radiation source 10 is directed at the object being viewed by sensing device 14. The realignment or boresighting may require specialized equipment since a laser spot on the object is often invisible to the sensing device. This invisibility may be due to different wavelengths of the laser radiation and that used for viewing the object—a typical value of the wavelength of the laser energy used being 1.06 micrometers, a typical FLIR being sensitive to radiation in a range of about 8-12 micrometers.

According to the present invention, there is provided a boresighting system which, while being at least as accurate as conventional boresighting equipment, gives considerable flexibility in installation and operation, and provides a way of easily correcting systematic and other errors.

The boresighting system of the present invention typically includes a rigid reference member or frame 18 which defines a reference location 20, the function of which is described below. A laser beam which exits radiation source 10 is emitted along optical axis 12 generally towards reference location 20. The beam is focused by optics 19 onto a position detector 26 for determining the position of the laser beam relative to the reference location thereby, as described below, determining any deviation between the axes 12 and 16.

Position detector 26 is mounted at a predetermined position on frame 18 and is typically centered about optical axis 12. Position detector 26 may be any suitable apparatus, and is typically a photodetector, such as a SiTek PSD Position Sensing Detector 2L4 manufactured by SiTek Electro Optics of Pattilie, Sweden. Detector 26 defines a planar surface generally at right angles to optical axis 12 and provides planar coordinates of the position of impingement of the laser beam relative to the reference location, to a microprocessor 28.

Also mounted onto frame 18 in a predetermined position and at a predetermined distance from detector 26, is a reference image source 30, typically a heated wire cross hair of conventional construction. Image source 30 provides a radiation output which, after being focused to infinity by optics 21, is sensed by optical sensing device 14.

Source 30 preferably emits radiation in a pattern defining a reference point. Optical sensing device 14 provides a view signal, typically to microprocessor 28, which indicates the coordinate position of the reference point in the picture plane.

Once the perceived location of the reference point of the radiation pattern emitted by source 30 is known, the relationship between the respective lines of sight of laser 10 and optical sensing device 14 may be determined. This will become apparent from the further description below.

Optionally, to move the boresighting system into an operative position, a signal is supplied to microprocessor 28 by means of a positional control unit, as diagrammatically indicated at 32. Accordingly a command is sent from microprocessor 28 to a motor 34, which moves position detector 26 and reference image 30 into position along the respective first and second optical axes 12 and 16. Alternatively, the boresighting system may be left permanently in place. For this alternative the partial blockage of the laser beam and the field of view of the FLIR will cause only minor vignetting of the image and slight loss of laser intensity at the target.

Radiation source 10 is operated and detector 26 provides a signal output to microprocessor 28. Depending on the precise type of laser being used, a number of pulsed beams or a continuous beam may be emitted so that the microprocessor can eliminate the effects of scattering and jitter. This signal indicates to microprocessor 28 the displacement of the laser beam from the reference location 20. Since the focal length of optics 19 is known (=f), then the angular deviation of the beam in the x and y directions ($\Phi_B$, $\theta_B$) can be calculated from the x and y displacements ($\delta x_p$, $\delta y_p$) as $\Phi_B = \delta x_p/f$; $\theta_B = \delta y_p/f$ for small deviations.

Simultaneously with the operation of the laser, source 30 is operated so as to provide the reference radiation pattern, as described above, in the field of view of sensing device 14. The pattern, which is imaged on sensing device 14, is supplied in the form of a video signal to microprocessor 28 which senses the location of the reference pattern. The x and y angular deviations of the optical sensing device ($\Phi_S$, $\theta_S$) are also computed based on the displacement of the reference image at sensing device 14. The angular deviation between the actual axis of radiation source 10 and sensing device 14 is thus the difference of angular deviations ($\Phi_B$, $\theta_B$) and ($\Phi_S$, $\theta_S$).

Based on the two angular computations microprocessor 28 provides a video symbol, such as might take the form of cross-hairs, for display by a visual display 36 and superimposed on the infrared image also displayed thereon. This calculated symbol is calculated by microprocessor 28 so as to compensate for the calculated angular difference between source 10 and sensing device 14, so that the symbol is now boresighted with radiation source 10.

When the boresighting is terminated, the coordinates of the cross hairs symbol are stored in the microprocessor's memory and the symbol is maintained at these coordinates until the next boresighting. Once boresighting has been terminated, according to one embodiment of the invention, the reference frame is returned, by means of motor 34, to a nonoperative position so as to avoid its obscuring the image.

The performance of the previously described boresighting procedure requires knowledge of an initial boresighting reference. In order to determine the initial boresighting reference, it is necessary to determine the initial position of the cross-hairs (before bore-sighting correction) and to determine a transformation to correct the position of the cross hairs during boresighting to compensate for angular deviation of the laser beam which may develop from time to time. In order to determine this initial position and transformation, a calibration of the system is performed.

Figure 2:
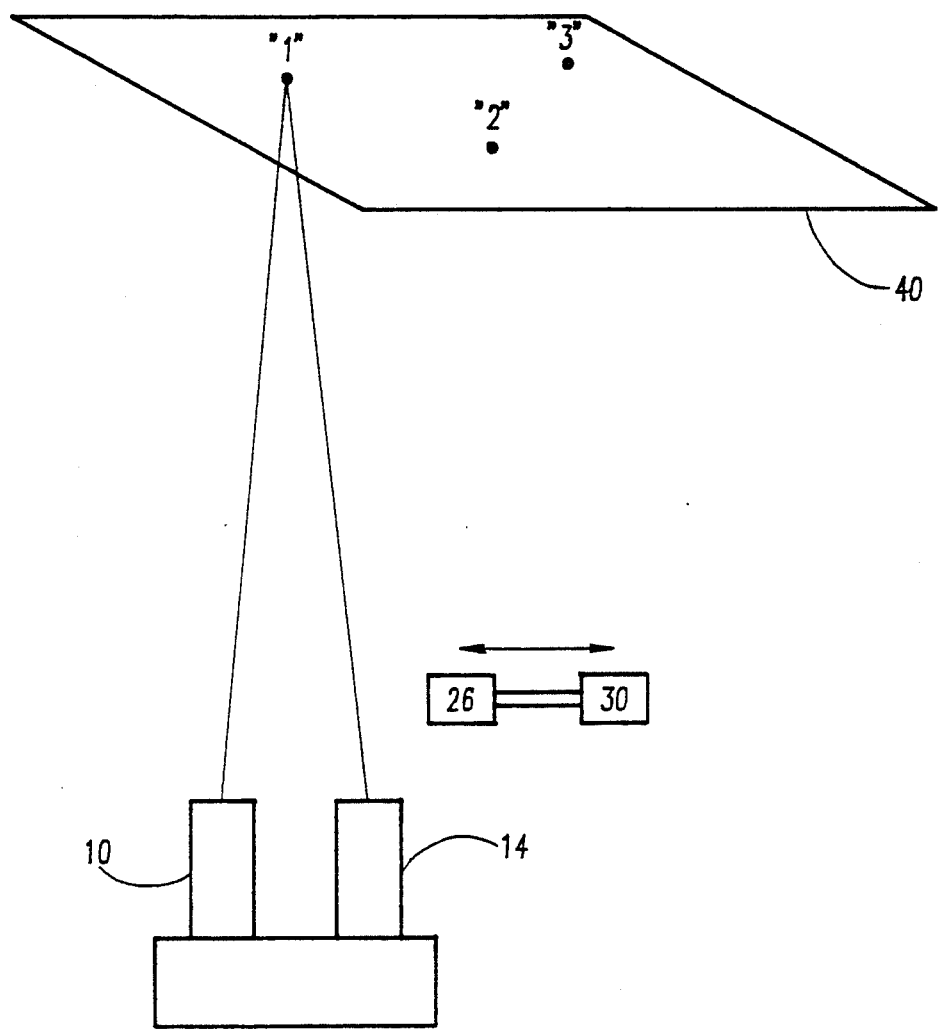
FIG. 2 is an illustration of the calibration of the boresighting device in accordance with a preferred embodiment of the invention.

FIG. 2 illustrates this calibration method in schematic form. Detector 26 and reference source 30 are replaced by an external target 40, which is preferably placed far from source 10 and sensing device 14, so that parallax effects between the axes of source 10 and sensing device 14 can be neglected. In the event target 40 is not far enough away to neglect parallax effects, they can be compensated for as is known in the art.

Target 40 is provided with a surface which when irradiated by the laser beam, for example at point "1", emits radiation at a frequency which is visible to sensing device 14. This emitted signal may be generated by thermal effects (i.e., heating of target 40) or by other effects such as polarization or other effects as are known in the art. The position of this emitted radiation as measured by detector 14 is recorded by microprocessor 28 as $(X_{OC1}, Y^{OC1})$. Microprocessor 28 records this position as the reference position of the cross hairs on video display 36.

Position detector 26 is replaced in its position. The position of the beam is measured by position detector 26 and stored as $(X_{DC1}, Y^{DC1})$. The position of the reference image is also recorded as $(X_{RC}, Y^{RC})$.

Detector 26 is removed and a wedge or other beam deviator is placed in the laser beam to deviate the beam such that it impinges a second point ("2") Measurements using target 40 and sensing device 14 on the one hand and detector 26 on the other are repeated to produce image positions pairs $(X_{OC2}, Y^{OC2})$, $(X_{DC2}, Y^{DC2})$. The position of the wedge is changed to form a third spot ("3") and measurements are taken for $(X_{OC3}, Y_{OC3})$, $(X_{DC3}, Y_{DC3})$.

The relationship between the measurements made using target 40 and those made using detector 26 can be expressed as:

$$X_{OCi} = a_{xx} \cdot X_{DCi} + a_{xy} \cdot Y_{DCi} + a_x \equiv f_x(DCi)$$

$$Y_{OCi} = a_{yx} \cdot X_{DCi} + a_{yy} \cdot Y_{DCi} + a_y \equiv f_y(DCi)$$

where i=1, 2, or 3.

Using the 6 equation defined above, the values of $a_{xx}$, $a_{xy}$, $a_{yx}$, $a_{yy}$, $a_x$ and $a_y$ can be calculated by, for example, matrix inversion.

Thus, during boresighting, when a deviation from the original position ($X_{DC1}, Y_{DC1}$) is detected, the above equations are used to determine the equivalent deviation on optical sensing device 14 and the cross-hairs are moved by microprocessor 28 to this new position.

In addition during boresighting the position of pattern 23 on optical sensing device 14 is determined and compared to $(X_{RC}, Y^{RC})$. Any difference is caused by changes in alignment of optical sensing device 14 and is compensated by an additional movement of the cross-hairs by microprocessor 28.

In summary the process of alignment and boresighting comprises the following steps:

1) An initial calibration step in which the reference position of the cross-hairs and the functional relationship between target position as measured by detector 26 and sensing device 14 is determined and 2) a boresighting step in which firstly, the movement of laser beam impingement on detector 26 (as compared to the calibration step ) is measured and converted ( using the functional relationship ) into a required change in the position of the cross-hairs on the display to compensate for change in alignment of source 10; and secondly, the movement of pattern 23 (as compared to the calibration step) is used to further move the cross-hairs to compensate for change in alignment of sensing device 14.

In practice the boresighting measurement is made often, since the boresighting apparatus is part of the system, while the measurement of calibration of the boresighting system is made less frequently.

The total correction can be made by moving the cross-hairs on the sensing device to compensate for the total deviation or by making an inverse correction on the image and moving the image in the opposite direction.

It will be noted that the boresighting system according to the present preferred embodiment of the present invention does not have an optical path between radiation source 10 and sensing device 14 as is common in previous boresighting devices. This difference is important since optical systems using devices to form such a path are complicated and themselves subject to misalignment. The structure of the present invention, on the other hand, is rugged and does not require frequent adjustment.

In a further preferred embodiment of the invention, for systems in which the sighting of the laser 10 is relatively stable and correction is only required for instability of the FLIR, a simplified boresighting apparatus is provided.

In this case position detector 26 is omitted and only reference image source 30 is used in the boresighting. During the calibration phase it is now unnecessary to determine three points of impact using the wedge and only one measurement is required. During this phase, the position on optical sensing device 14 of the image of the target response to the laser is noted and (with correction for parallax if necessary) the cross-hairs on the video display are placed at this position.

The position of the reference image on optical sensing device is also measured and is preserved for later reference. During boresighting, the position of the reference image is measured and its distance from the reference position is calculated. This distance is then added as a correction to the cross-hair position to correct for changes in sighting of the optical sensing device 14.

It will be appreciated by persons skilled in the art that the present invention is not limited to the precise embodiments shown and described hereinabove. The present invention is limited, rather, solely by the claims, which follow:

We claim:

1. An optical system comprising:
   a generator for generating a beam of radiation;
   an optical sensing device; and
   apparatus for boresighting the optical sensing device with the beam of radiation without there being required an optical interconnection between the generator and the optical sensing device and including:
   a beam location sensor operative to determine the location of the beam of radiation relative to a given beam reference location defined therein; and
   an aiming location fixed in position with respect to the beam location sensor and providing an optical system reference image at a predetermined spatial separation from the beam reference location, which separation is determined by virtue of said aiming locator being fixed in position with respect to the beam location sensor.

2. Apparatus according to claim 1 wherein the beam location sensor comprises a position detector placed in the beam of radiation.

3. Apparatus according to claim 1 wherein the optical sensing device is operative to sense infra-red radiation outside the visible spectrum.

4. Apparatus according to claim 1 wherein the apparatus for boresighting is operative to provide a video output indicating the aiming location superimposed on the field of view seen by the optical sensing device.

5. Apparatus according to claim 4 and including:
   means for adjusting the position of the video output indicating the aiming location in response to the output indication.

6. Apparatus according to claim 1 wherein the optical sensing device operates at a first wavelength and the beam of radiation is at a second wavelength different from the first wavelength.

7. Apparatus according to claim 1 wherein the reference image is directly sensible by the optical sensing device.

8. Apparatus according to claim 1 wherein the reference image is indirectly sensible by the optical sensing device.

9. For use with any optical system including a generator for generating a beam of radiation and an optical sensing device:
   apparatus for boresighting the optical sensing device with the beam of radiation without there being required an optical interconnection between the generator and the optical sensing device and including:
   a beam location sensor operative to determine the location of the beam of radiation relative to a given beam reference location defined therein; and
   an aiming locator fixed in position with respect to the beam location sensor and providing an optical system reference image at a predetermined spatial separation from the beam reference location, which separation is determined by virtue of said aiming location being fixed in position with respect to the beam location sensor.

10. Apparatus according to claim 9 wherein the beam location sensor comprises a position detector placed in the beam of radiation.

11. Apparatus according to claim 9 wherein the optical sensing device is operative to sense infra-red radiation outside the visible spectrum.

12. Apparatus according to claim 9 wherein the apparatus for boresighting is operative to provide a video output indicating the aiming location superimposed on the field of view seen by the optical sensing device.

13. Apparatus according to claim 12 and including:
    means for adjusting the position of the video output indicating the aiming location in response to the output indication.

14. Apparatus according to claim 9 wherein the optical sensing device operates at a first wavelength and the beam of radiation is at a second wavelength different from the first wavelength.

* * * * *